No. 857,528. PATENTED JUNE 18, 1907.
J. A. MANAHAN.
SHAFT HANGER.
APPLICATION FILED JUNE 2, 1906.
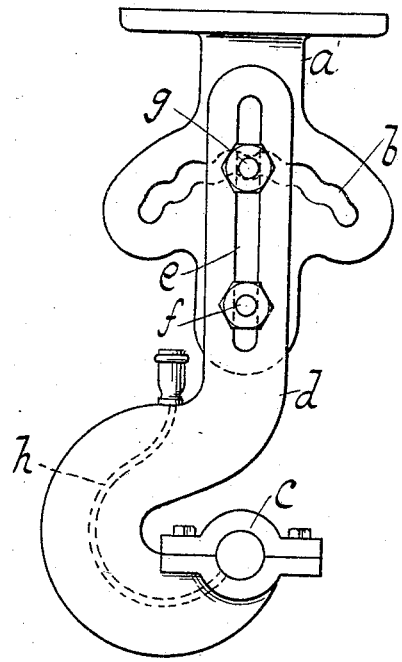
WITNESSES:
William Miller
Edward Wiener
INVENTOR
Joseph A. Manahan
BY
W. C. Hauff
ATTORNEY

UNITED STATES PATENT OFFICE.

JOSEPH A. MANAHAN, OF NEW YORK, N. Y.

SHAFT-HANGER.

No. 857,528.

Specification of Letters Patent.

Patented June 18, 1907.

Application filed June 2, 1906. Serial No. 319,935.

*To all whom it may concern:*

Be it known that I, JOSEPH A. MANAHAN, a citizen of the United States, residing at Manhattan, in the city, county, and State of New York, have invented new and useful Improvements in Shaft-Hangers, of which the following is a specification.

By means of this invention adjustment of a shaft can be readily and accurately secured.

This invention is set forth in the following specification and claim and illustrated in the annexed drawing which illustrates a side view of a hanger embodying this invention.

The object of this invention is to provide a shaft hanger with means for vertical as well as lateral adjustment.

In this drawing the letter $a$ designates a bracket which is adapted to be fastened to a beam or girder. This bracket is provided with a segmental slot $b$ having corrugated edges along its periphery. The journal box is shown at $c$ and the arm $d$ thereof has a vertical slot $e$. The arm is adjustably connected to the bracket by the nut and bolt connections $f$ and $g$. An oil channel $h$ in the arm of the hanger leads from underneath into the journal box where the oil is carried around the shaft by its rotary force. The hanger is perfectly rigid when the nuts of the bolts $f$ and $g$ are tightened. To adjust the hanger vertically it is simply necessary to loosen the bolts and raise or lower the slotted arm with the journal box. Or if lateral adjustment is wanted it can be accomplished by loosening the bolt nuts and swinging the arm with bolt $f$ as a center and the segmental slot as a guide to the bolt $g$ then when the nuts of bolts are again tightened the arm will be secured to the bracket at whatever angle it is fixed.

I claim:

A shaft hanger or bracket having a segmental or curved slot, and an arm having a longitudinal or vertical slot combined with a bolt secured to the hanger and extended into the slot of the arm and a second bolt extended through the slots of the arm and hanger, and said segmental slot having serrated or corrugated edges to provide an antislipping medium for the bolt therein.

In testimony whereof I have hereunto set my hand in the presence of two subscribing witnesses.

JOSEPH A. MANAHAN.

Witnesses:
 EDWARD WIESNER,
 GEORGE HULSBERG.